US006771498B2

(12) United States Patent
Wang et al.

(10) Patent No.: US 6,771,498 B2
(45) Date of Patent: Aug. 3, 2004

(54) COOLING SYSTEM FOR HINGED PORTABLE COMPUTING DEVICE

(75) Inventors: Hwai-Ming Wang, Taipei (TW); Wei-Chieh Chiang, Miaoli (TW); Hsien-Tsang Liu, Banchiau (TW)

(73) Assignee: Thermal Corp., Stanton, DE (US)

( * ) Notice: Subject to any disclaimer, the term of this patent is extended or adjusted under 35 U.S.C. 154(b) by 0 days.

(21) Appl. No.: 10/280,726

(22) Filed: Oct. 25, 2002

(65) Prior Publication Data

US 2004/0080908 A1 Apr. 29, 2004

(51) Int. Cl.⁷ .................................................. G06F 1/20
(52) U.S. Cl. ................ 361/687; 165/80.3; 165/104.33; 62/259.2; 174/15.2
(58) Field of Search .............................. 361/687–714; 165/80.1–80.4, 104.33, 185; 62/259.2; 174/15.2

(56) References Cited

U.S. PATENT DOCUMENTS

| | | | |
|---|---|---|---|
| 3,831,664 A | | 8/1974 | Pogson |
| 4,345,642 A | | 8/1982 | Ernst et al. |
| 5,117,901 A | | 6/1992 | Cullimore |
| 5,383,340 A | | 1/1995 | Larson et al. |
| 5,588,483 A | * | 12/1996 | Ishida .......................... 165/86 |
| 5,621,613 A | * | 4/1997 | Haley et al. ................. 361/687 |
| 5,646,822 A | * | 7/1997 | Bhatia et al. ................ 361/687 |
| 5,757,615 A | * | 5/1998 | Donahoe et al. ............ 361/687 |
| 5,781,409 A | * | 7/1998 | Mecredy, III ................ 361/687 |
| 5,796,581 A | * | 8/1998 | Mok ............................ 361/687 |
| 5,822,187 A | * | 10/1998 | Garner et al. ............... 361/687 |
| 5,832,987 A | * | 11/1998 | Lowry et al. ................. 165/86 |
| 5,847,925 A | * | 12/1998 | Progl et al. .................. 361/687 |
| 5,880,929 A | * | 3/1999 | Bhatia ......................... 361/687 |
| 6,031,716 A | * | 2/2000 | Cipolla et al. .............. 361/687 |
| 6,097,596 A | * | 8/2000 | Cipolla et al. .............. 361/687 |
| 6,097,597 A | * | 8/2000 | Kobayashi ................... 361/687 |
| 6,122,166 A | | 9/2000 | Mochizuki et al. |
| 6,134,106 A | * | 10/2000 | Tao et al. .................... 361/687 |
| 6,175,493 B1 | * | 1/2001 | Gold ........................... 361/687 |
| 6,185,102 B1 | * | 2/2001 | Shou et al. .................. 361/704 |
| 6,288,896 B1 | * | 9/2001 | Hsu ............................. 361/687 |
| 6,341,062 B1 | * | 1/2002 | Patel ........................... 361/687 |
| 6,377,452 B1 | * | 4/2002 | Sasaki et al. ............... 361/687 |
| 6,507,488 B1 | * | 1/2003 | Cipolla et al. .............. 361/687 |
| 6,556,439 B2 | * | 4/2003 | Shibasaki .................... 361/687 |
| 6,587,336 B2 | * | 7/2003 | Chu et al. .................... 361/687 |
| 6,611,425 B2 | * | 8/2003 | Ohashi et al. .............. 361/687 |

FOREIGN PATENT DOCUMENTS

JP          2001134345 A  *  5/2001  ............. G06F/1/20

* cited by examiner

Primary Examiner—Lisa Lea-Edmonds
(74) Attorney, Agent, or Firm—Duane Morris LLP

(57) ABSTRACT

A cooling system for a hinged portable computing device is provided having a first passive heat transfer device is carried within a first housing portion of the computer and a second passive heat transfer device that is carried within a second housing portion of the portable computer. A hinge structure interconnects the first and second housing portions for pivotal movement relative to one another, where the hinge structure includes a heat conductive first gudgeon having a pintle and a thermal interface block. The thermal interface block is disposed in the second housing portion and connected in thermal communication with the second first passive heat transfer device. A heat conductive second gudgeon is also provided having a journal and a thermal interface block. The thermal interface block of the second gudgeon is connected in thermal communication with the first passive heat transfer device, and the pintle is rotatably received within the journal so as to be in heat exchange relationship with the second gudgeon, thereby forming an integral portion of the hinge structure. In one embodiment, a third passive heat transfer device is also employed within the first housing portion of the computer.

21 Claims, 13 Drawing Sheets

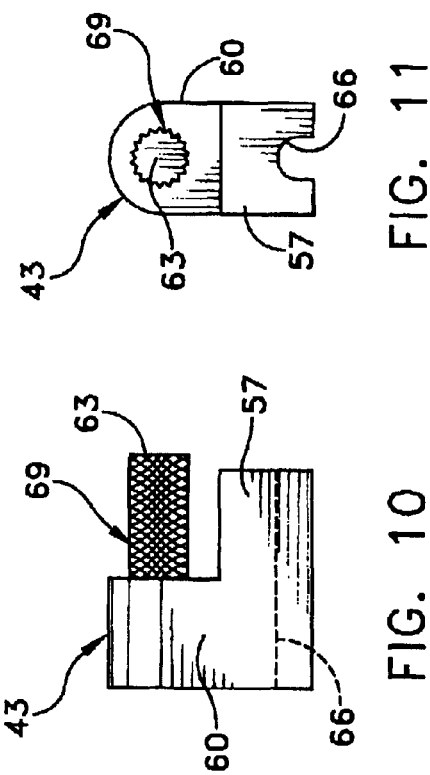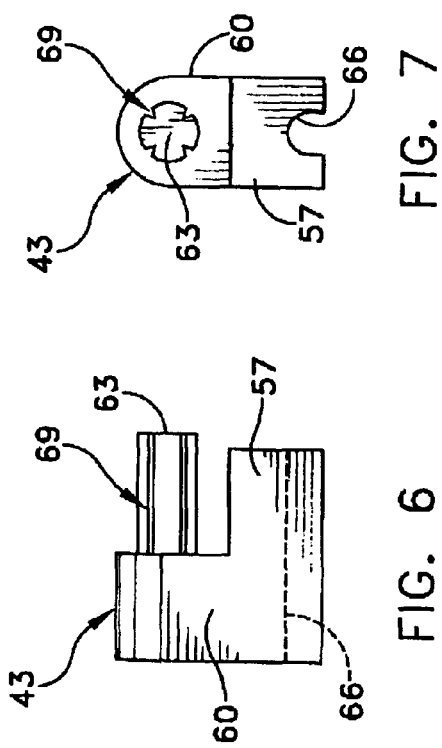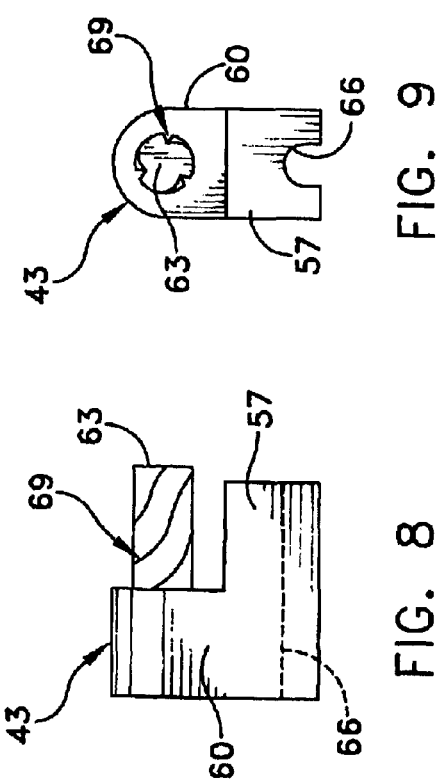
FIG. 6 FIG. 7 FIG. 8 FIG. 9 FIG. 10 FIG. 11

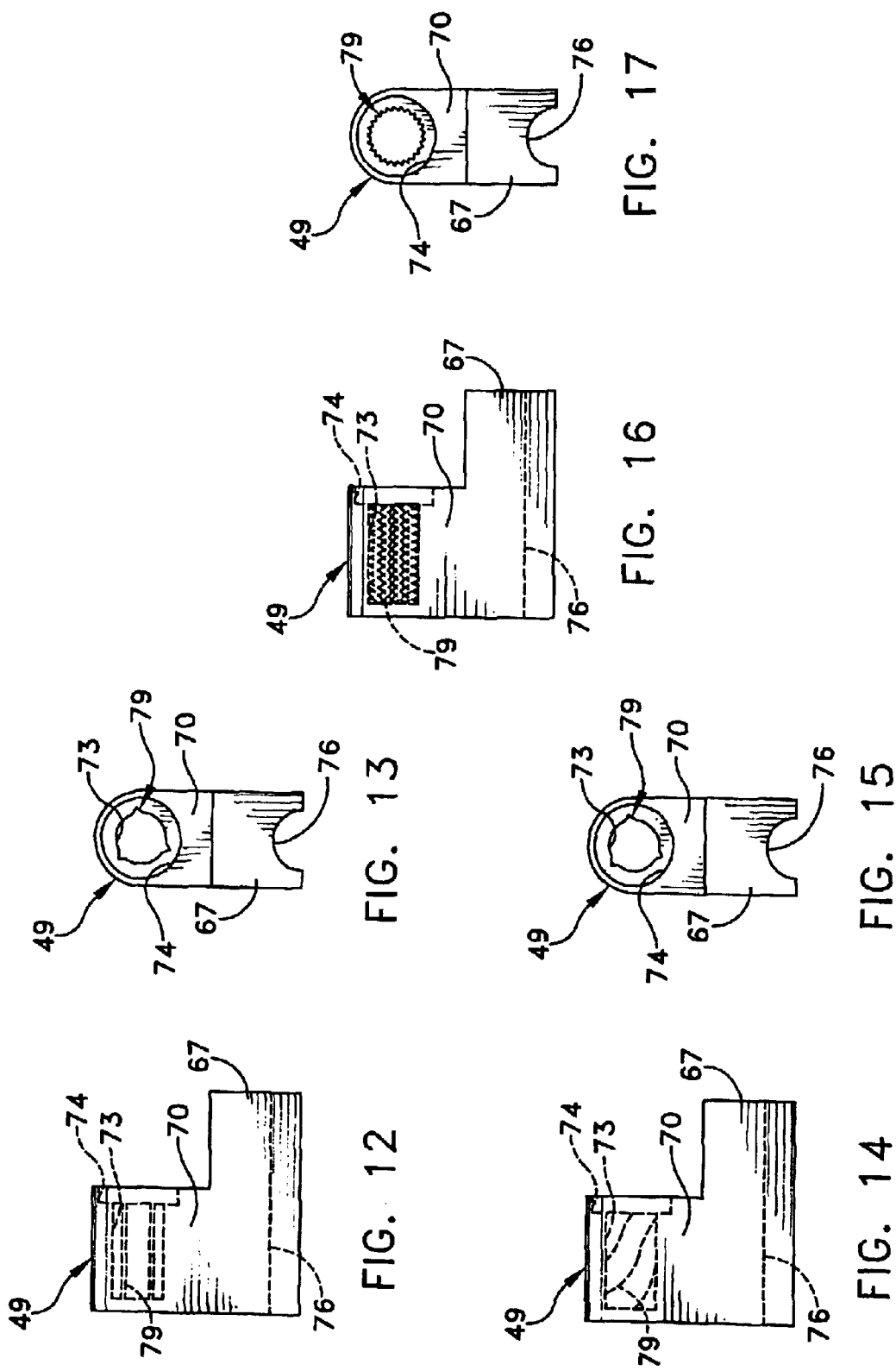

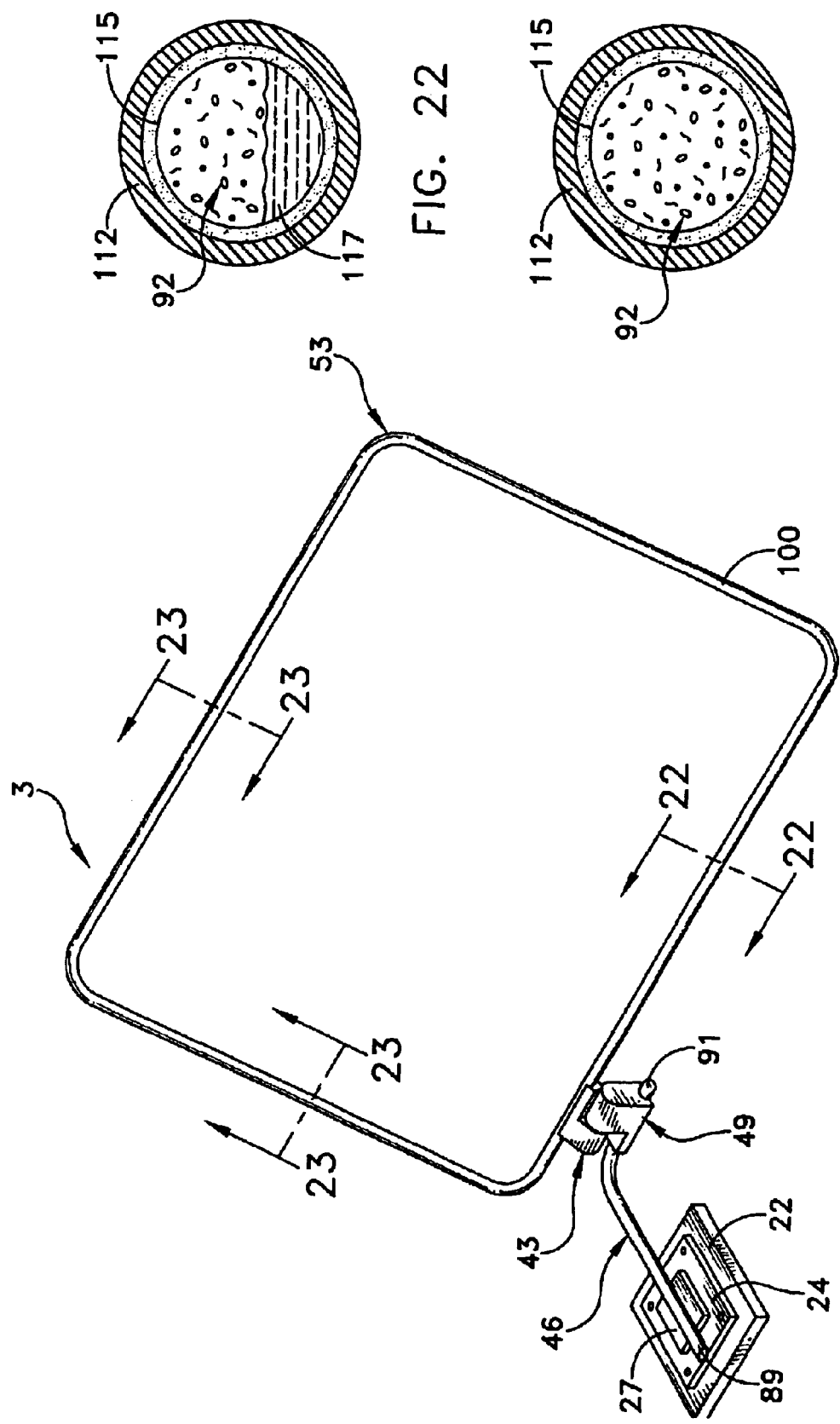

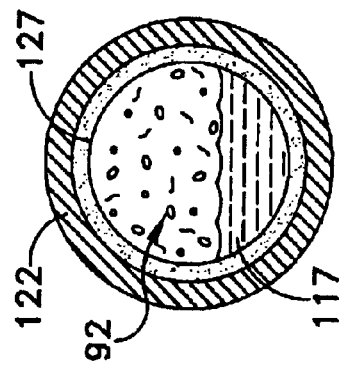
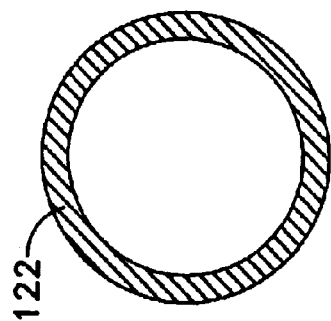
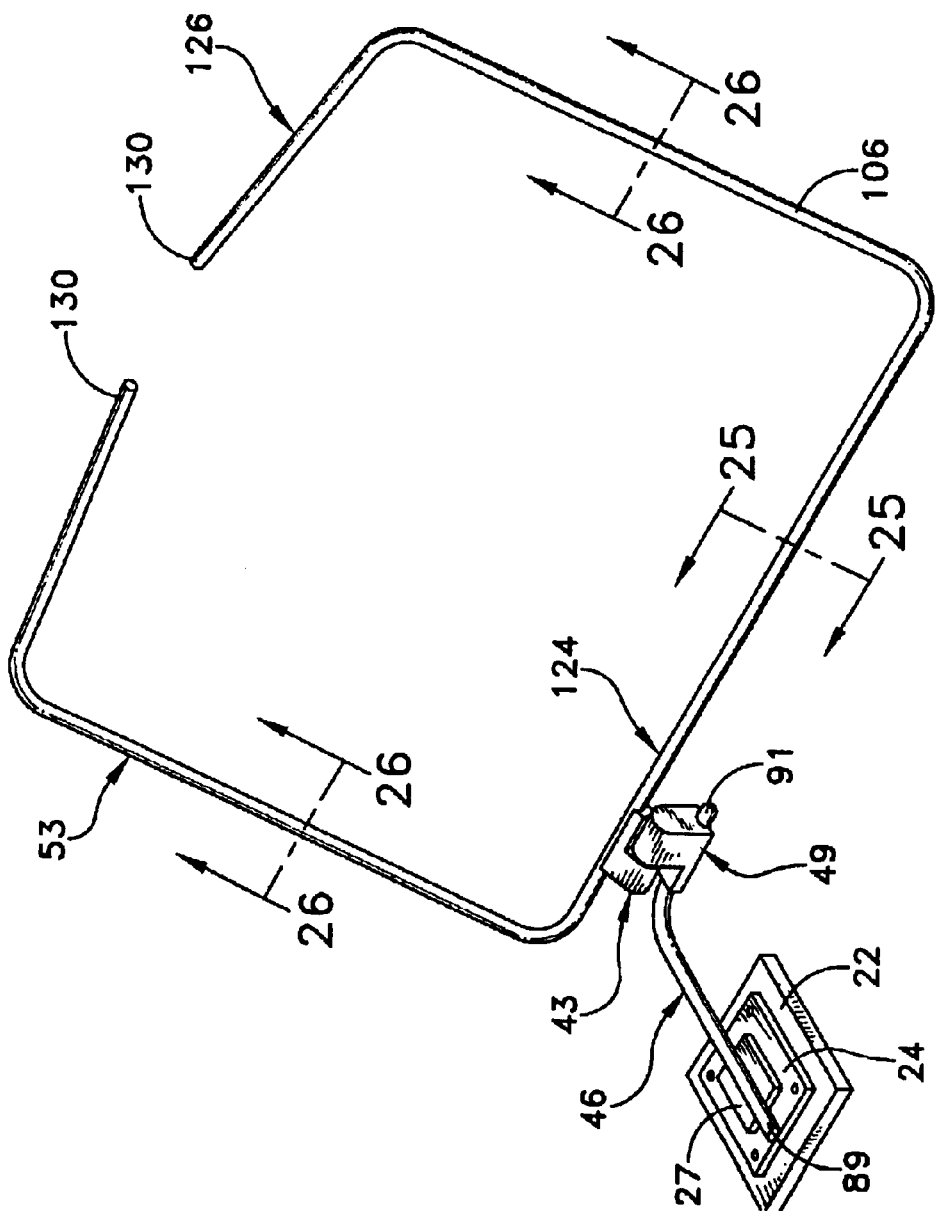

COOLING SYSTEM FOR HINGED PORTABLE COMPUTING DEVICE

FIELD OF THE INVENTION

The present invention generally relates to apparatus for cooling electronic components included in a portable computer, such as a laptop, notebook, subnotebook and the like and, more particularly, to a two-tier cooling apparatus for such a computer.

BACKGROUND OF THE INVENTION

Over recent years there has been widespread development of personal computers, with a dramatic increase in the design, development and sale of computers which are portable. These portable computers are not significantly larger than small portable typewriters, and contain their own built-in central processing unit, memory, hard drive, disk drives, keyboard, display and carrying handle. The keyboard usually projects forwardly from a base and the display is typically a liquid crystal display contained on one side of a panel or lid which folds down flat on the upper surface of the keyboard to serve as a cover to protect the keyboard and display during storage and travel.

Laptop computers typically utilize the newest generation of integrated circuits which often operate at sufficiently high frequencies that they generate more heat than can be dissipated by conventional heat sinks or the like. Increases in heat generation have often been accommodated by simply increasing the quantity or size of these heat dissipation elements. However, the relatively small size of a portable, laptop computing device complicates heat dissipation by limiting airflow, crowding heat generating components, and reducing the space available for heat dissipation devices. As a consequence, portable computing devices today utilize systems that cannot easily be cooled by natural convection or by forced air cooling systems.

One area of laptop computers that has been exploited for dissipating heat is the back of the display portion of the case. This area has not been used effectively to dissipate heat in many prior art laptops because it was difficult to convey heat to this area from the processor region of the laptop without passing through some type of hinge structure forming a connection between the lower housing of the laptop and the display panel. While at a first view this appears to be an obvious way to transfer heat from the main body of a laptop computer through the hinge and to the area behind the display, this is not a straightforward or simple task. The geometry and heat transfer capacity of a conventional hinge are not suitable for transferring heat between the base and display of a portable computing device. The main difficulty in transferring heat between the base and the display through a conventional hinge is that many efficient heat conductors, e.g., heat pipes, thermal loops, cold plates, are not capable of sustaining the repetitive motion expected between the hinged base and display without becoming brittle due to stress fatigue. Since a heat pipe is a solid hermetically sealed unit, it does not readily lend itself to any mechanical motion of one end while the other end remains fixed, as would be the case if a heat pipe were passed directly through the hinge of a portable computer. In order to produce a reliable product with a heat pipe based thermal management scheme, it must be implemented so as to minimize any bending stresses in the material in order to minimize the possibility of failure.

There have been many prior art solutions to the problem of transferring heat from the main body of a laptop computer, through a hinge mechanism, to the area behind the display screen. For example, U.S. Pat. No. 5,880,929, issued to Bhatia discloses a heat exchanger system for use in a hinged computing device. The hinged computing device includes a base housing connected to a display housing by one or more hinges. A number of heat generating electronic components are located within the base housing, and a display screen is positioned in the display housing. The heat exchanger system includes a heat pipe located in the base and thermally coupled to both an electronic component and the hinge to allow heat transfer from the electronic component to the hinge. A flat plate heat pipe located in the display housing is mechanically and thermally coupled to the hinge to allow heat transfer from the hinge to the flat plate heat pipe for dissipation through the display housing.

U.S. Pat. No. 6,122,166, issued to Mochizuki et al., discloses a device for cooling a personal computer that includes a body having a heat generating electronic element and a keyboard section connected in an openable manner to the personal computer body through a hinge. A first heat pipe, which has one end portion connected to the electronic element in a heat transferring manner, and a second heat pipe, which has one end portion arranged along an electromagnetic insulating plate mounted in the keyboard section, are connected through the hinge so as to rotate relative to each other.

U.S. Pat. No. 6,253,836, issued to Mitchell discloses a notebook computer having a base housing with a heat-generating microprocessor and a lid housing pivotally connected to the base housing. Operating heat from the microprocessor is transferred to the lid housing, via a specially designed thermosyphoning heat pipe structure formed from first and second heat pipes. The first heat pipe has a rectangular cross-section, an evaporating portion arranged in thermal communication with the microprocessor, and a coiled condensing portion centered about the lid hinge line and having a circularly cross-sectioned interior side surface defined by flat sides of the first heat pipe. The second heat pipe has a circular cross-section, an evaporating portion pivotally received within the coiled first heat pipe portion, and a condensing portion arranged in thermal communication with the lid housing. When the lid housing is opened and closed, the evaporating portion of the second heat pipe is rotated within the coiled first heat pipe portion and slidably engages its circularly cross-sectioned interior side portion.

U.S. Pat. No. 6,288,896, issued to Hsu discloses a heat dissipation system for use in hinged computing devices. The device includes a thermally conductive joint having first and second receptacles which are generally parallel to one another. A first heat pipe is at least partially disposed within the first receptacle, and is adapted to be thermally coupled to a heat source within the hinged computing device. A second heat pipe is at least partially disposed within the second receptacle, and is adapted to be thermally coupled to a heat sink. The thermally conductive joint permits the transfer of heat from the first heat pipe to the second heat pipe to transfer heat from the heat source to the heat sink portion of the hinged computing device.

U.S. Pat. No. 6,449,149, issued to Ohashi et al., discloses a cooling system for a laptop computer, where the computer includes a first casing on which are mounted a keyboard and a wiring board and a second casing which is rotatably mounted on the first casing with a hinge. The cooling structure of the laptop computer includes one or more elements that are the subject of cooling arranged within the first casing, a first heat-discharging member thermally connected with this element and the first casing, a second heat-discharging member that is arranged in the interior of the second casing, and an interconnection between them for thermally connecting the first heat-discharging element and the second heat-discharging element.

SUMMARY OF THE INVENTION

The present invention provides a cooling system for a hinged portable computing device having a housing including first and second portions, and a heat generating component carried in the first housing portion. A first passive heat transfer device is carried within the first housing portion, and includes a first end thermally coupled to the heat generating component and a second end. A second passive heat transfer device is carried within the second housing portion, and includes a first end thermally coupled to the second housing portion and a second end. A hinge structure interconnects the first and second housing portions for pivotal movement relative to one another, where the hinge structure includes a heat conductive first gudgeon having a pintle and a thermal interface block. The thermal interface block is disposed in the second housing portion and connected in thermal communication with the second first passive heat transfer device. A heat conductive second gudgeon is also provided having a journal and a thermal interface block. The thermal interface block of the second gudgeon is connected in thermal communication with the first passive heat transfer device, and the pintle is rotatably received within the journal so as to be in heat exchange relationship with the second gudgeon, thereby forming an integral portion of the hinge structure.

BRIEF DESCRIPTION OF THE DRAWINGS

These and other features and advantages of the present invention will be more fully disclosed in, or rendered obvious by, the following detailed description of the preferred embodiment of the invention, which is to be considered together with the accompanying drawings wherein like numbers refer to like parts and further wherein:

FIGS. 6–11 are elevational views of a display gudgeon formed in accordance with the present invention and having a variety of surface features formed on a pintle;

FIGS. 12–17 are elevational views of a base gudgeon formed in accordance with the present invention and showing a variety of surface features formed within the surface defining a journal in the gudgeon;

FIG. 21 is a perspective view of an alternative cooling system formed in accordance with the present invention comprising a closed loop heat pipe;

FIG. 22 is a cross-sectional view of the heat pipe shown in FIG. 21, as taken along line 22—22 in FIG. 21;

FIG. 23 is a cross-sectional view of the heat pipe shown in FIG. 21, as taken along line 23—23 in FIG. 21;

FIG. 24 is a further alternative embodiment of cooling system formed in accordance with the present invention comprising a thermosiphon;

FIG. 25 is a cross-sectional view of the thermosiphon as shown in FIG. 24, as taken along line 25—25 in FIG. 24;

FIG. 26 is a cross-sectional view of the thermosiphon as shown in FIG. 24, as taken along line 26—26 in FIG. 24;

DETAILED DESCRIPTION OF THE PREFERRED EMBODIMENT

Figure 1:
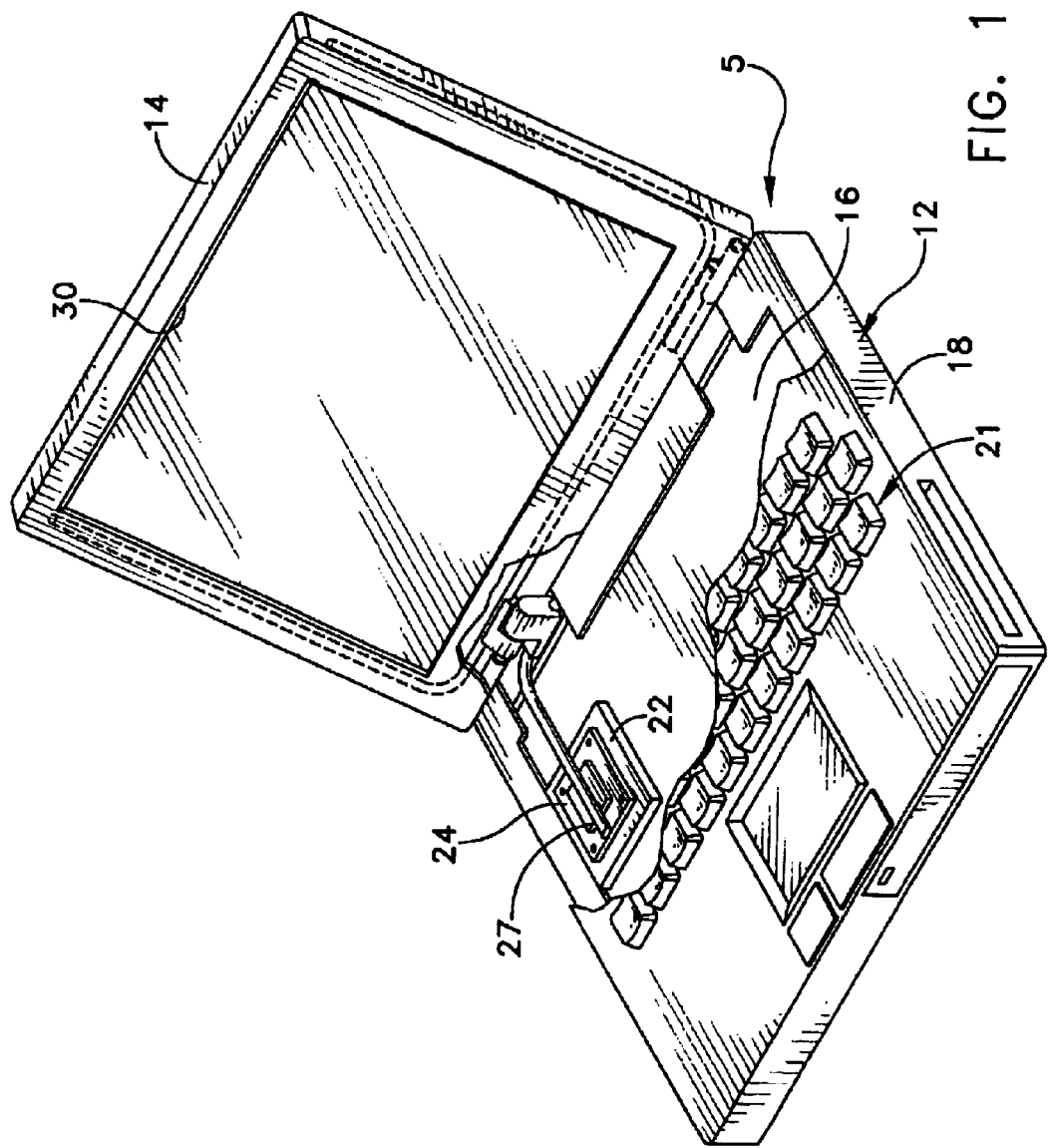
FIG. 1 is a perspective view of a portable computing device including a cooling system formed in accordance with the present invention.
Figure 2:
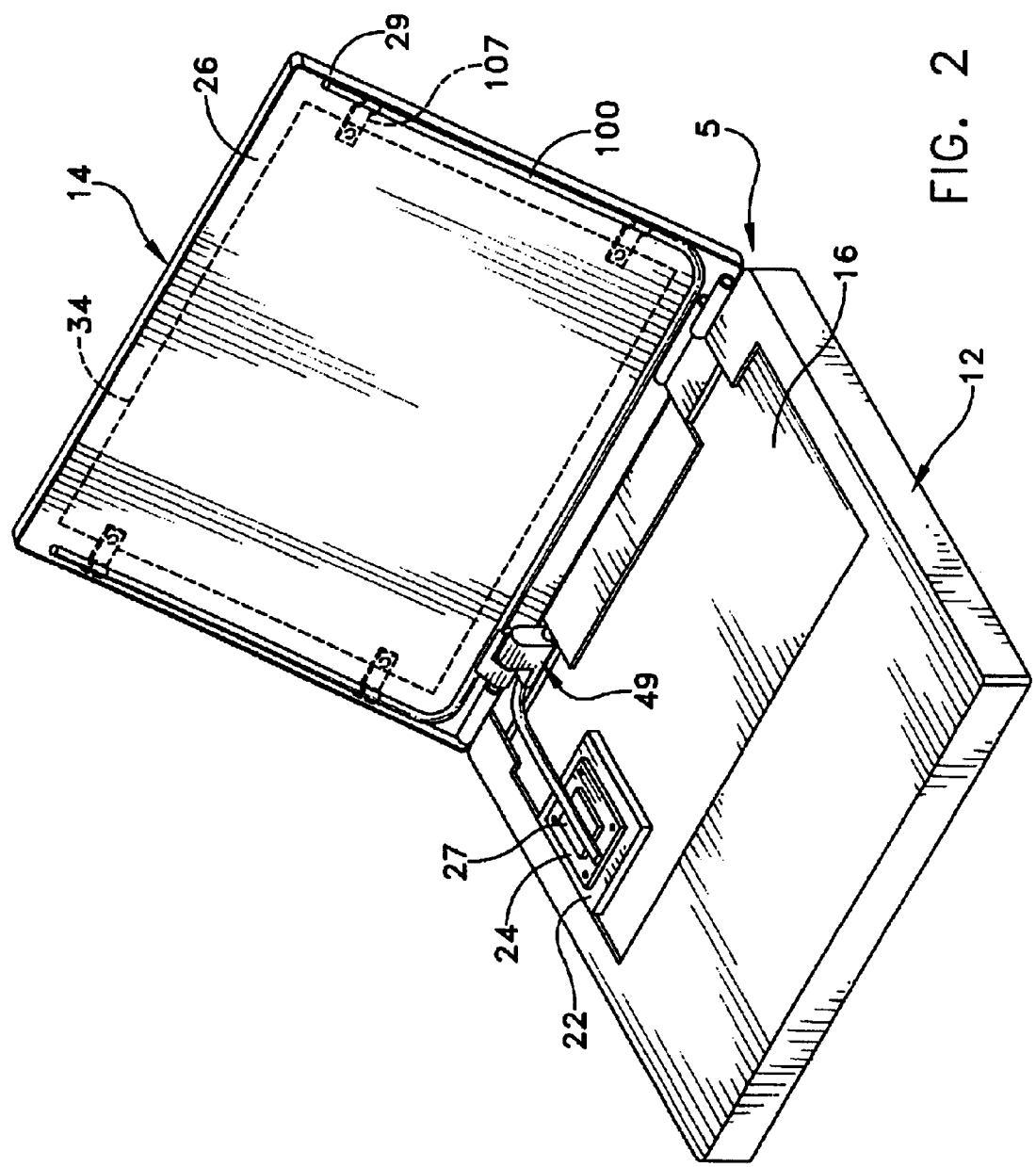
FIG. 2 is a perspective view of the portable computing device shown in FIG. 1, with the keypad and liquid crystal display removed for clarity of illustration.

This description of preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. In the claims, means-plus-function clauses are intended to cover the structures described, suggested, or rendered obvious by the written description or drawings for performing the recited function, including not only structural equivalents but also equivalent structures.

Figure 3:
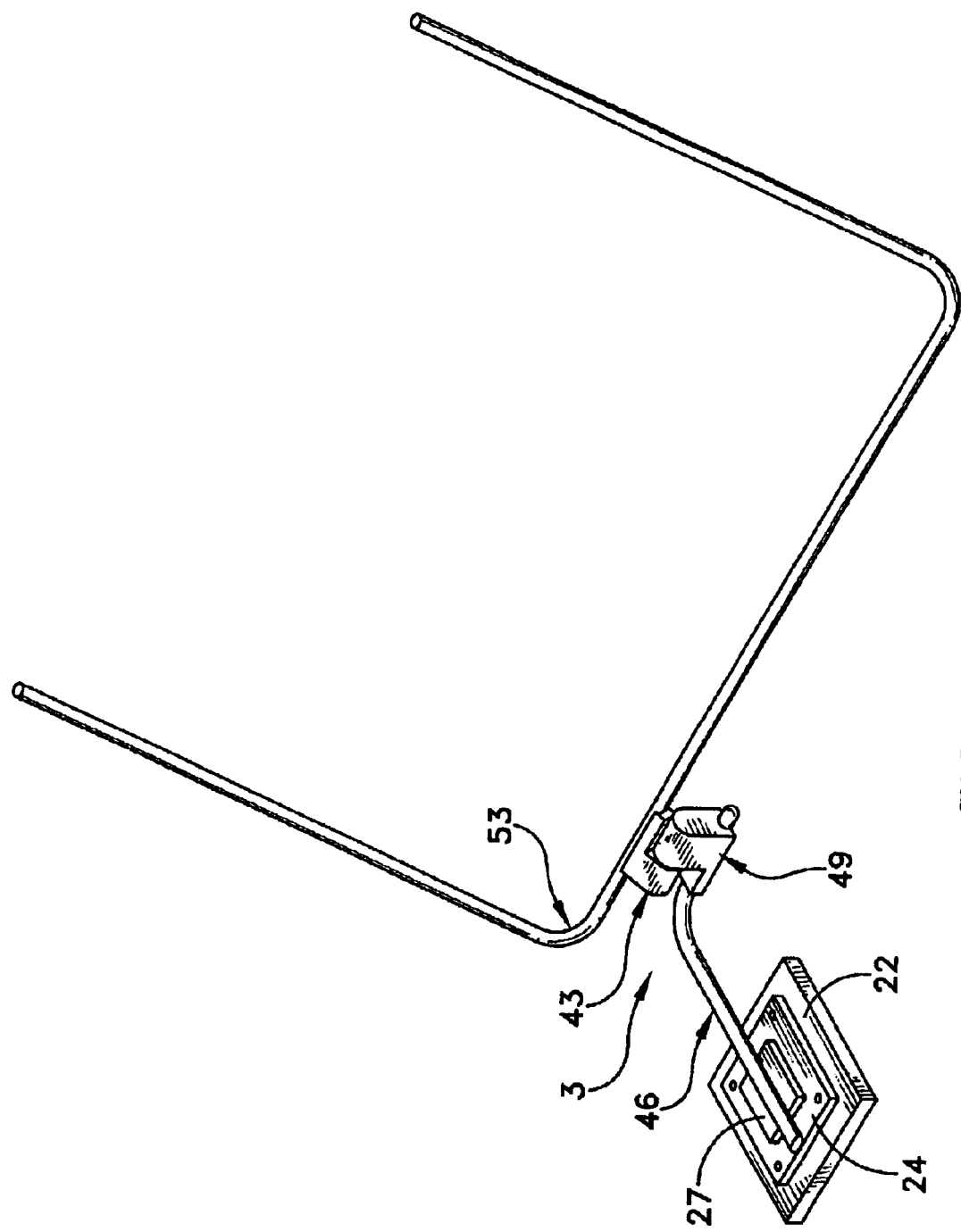
FIG. 3 is a perspective view of a cooling system for a portable computing device formed in accordance with the present invention.
Figure 5:
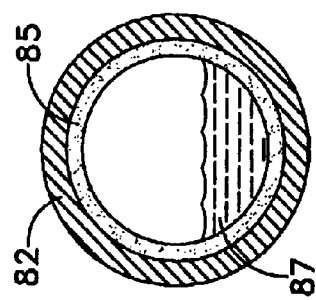
FIG. 5 is a cross-sectional view of a second passive heat transfer device shown in FIG. 4, as taken along line 5—5 in FIG. 4.
Figure 4:
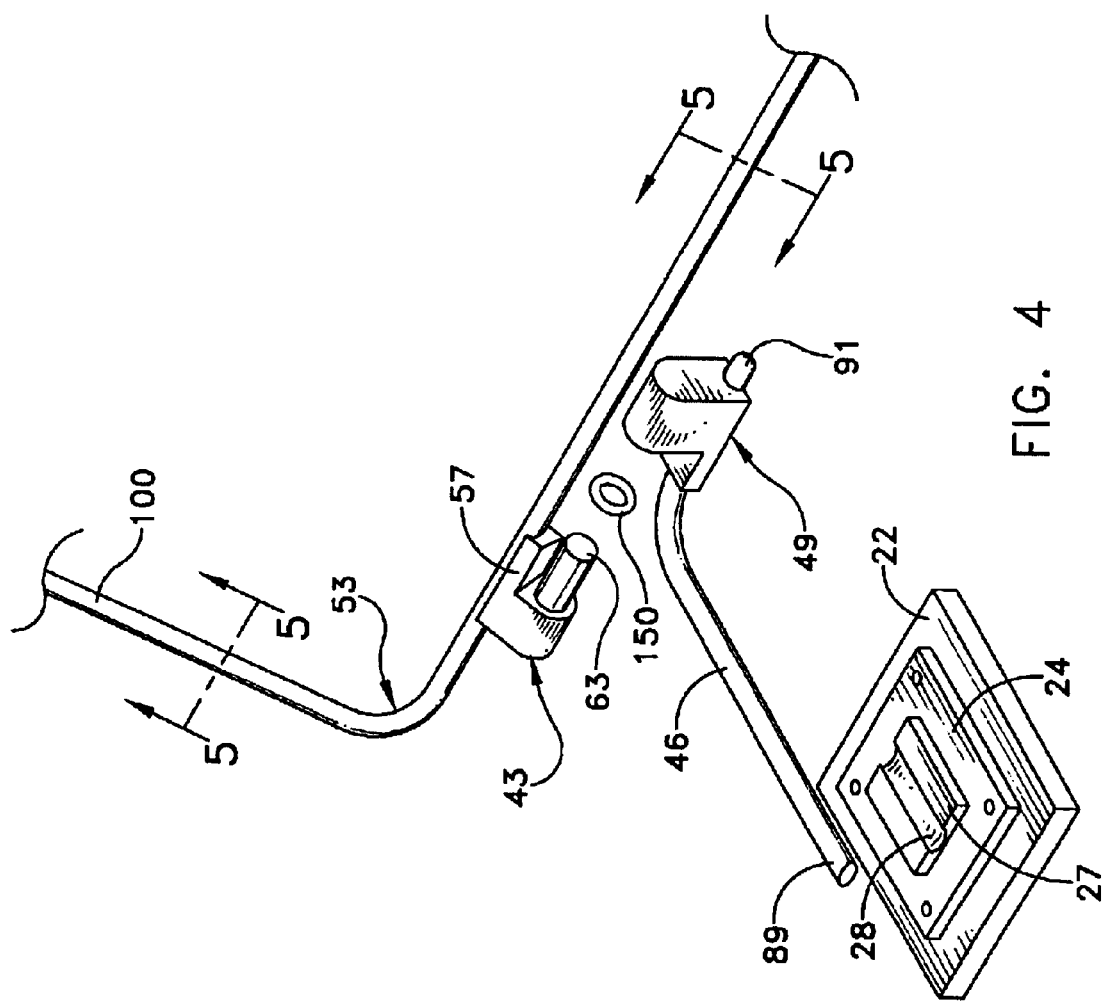
FIG. 4 is a broken-way, partially exploded perspective view, of the cooling system shown in FIG. 3.

Referring to FIGS. 1 and 3, a cooling system 3 formed in accordance with the present invention is sized and shaped so as to be mounted within a portion of a portable computing device, e.g., a personal digital assistant (PDA) or a notebook/laptop computer 5. Portable computer 5 includes a base 12 and a display housing 14. Base 12 has a generally rectangular shape with a bottom wall 16, an annular peripheral wall 18, and an open top side across which a keyboard structure 21 extends horizontally. A printed wiring board is 22 mounted on bottom wall 16, with a heat generating component, e.g., a processor chip 24, being operatively mounted on a top side of printed wiring board 22. A thermal block 27 is positioned atop processor chip 24 to conductively receive operating heat during operation of portable computer 5. A recessed slot 28 is defined in the top surface of thermal block 27 so as to receive a portion of a heat transfer device, as will hereinafter be disclosed in further detail (FIG. 4).

Display housing 14 comprises a rectangular configuration generally complementary to base 12, and includes a top wall 26, an annular peripheral wall 29, and an open bottom. A liquid crystal display screen 30 extends across the open bottom, surrounded by annular peripheral wall 29. A planar plate 34 is often set within display housing 14, along top wall 26, i.e., behind liquid crystal display screen 30. Planar plate 34 is formed from a highly conductive material, e.g., copper, aluminum, or their alloys, and is arranged in thermal transfer engagement with portions of cooling system 3.

The present invention transfers operating heat from processor 24 (or another heat generating components within base 12) by taking advantage of the large exterior surface area of display housing 14 so as to supplement radiant and convective heat dissipation to ambient environment. Referring to FIGS. 1–4, cooling system 3 serves to (i) pivotally interconnect display housing 14 to a rear edge of base 12 so as to allow for pivotal movement between a generally upright, open operating orientation and a generally horizontal, closed position; and (ii) transfer a considerable amount of the operational heat from processor 24 to display housing 14. In a preferred embodiment, cooling system 3 comprises a display gudgeon 43, a first passive heat transfer device 46, a base gudgeon 49, and a second passive heat transfer device 53.

More particularly, display gudgeon 43 includes a thermal block 57, a support arm 60, and a pintle 63 (FIGS. 6–11). Thermal block 57 is formed from a highly thermally conductive material, e.g., copper, aluminum, or their alloys, and includes a recess or groove 66 defined in an outer surface. Support arm 60 projects outwardly from an end of thermal block 57. Pintle 63 projects outwardly from a top end of support arm 60 so as to be positioned in substantially parallel relation to thermal block 57, and often in parallel relation to recess or groove 66. Pintle 63 comprises a solid, generally cylindrical pin that includes texturing in its outer surfaces that helps to increase available surface area. For example, a plurality of grooves 69 may be defined in the outer surface of pintle 63 in parallel relation to one another (FIGS. 6 and 7), in a helical arrangement (FIGS. 8 and 9), or a knurled configuration (FIGS. 10 and 11) so as to enhance the thermal energy transfer between display gudgeon 43 and base gudgeon 49.

Base gudgeon 49 includes a thermal block 67, a support arm 70, and a journal 73 (FIGS. 12–17). Thermal block 67 is formed from a highly thermally conductive material, e.g., copper, aluminum, or their alloys, and includes a recess or groove 76 defined in an outer surface. Support arm 70 projects outwardly from one end of thermal block 67. Journal 73 comprises a generally cylindrical blind hole, that extends inwardly from a top end of support arm 70 so as to be arranged in substantially parallel relation with thermal block 67, and often in parallel relation to recess or groove 76. A counter-sink 74 is annularly defined around the entrance to journal 73. Journal 73 also includes texturing on the inner surface of support arm 70, defining the blind hole, that is similar in pattern to the texturing formed on the outer surface of pintle 63. For example, a plurality of grooves 79 may be defined in the inner surface of journal 73 in parallel relation to one another (FIGS. 12 and 13), in a helical arrangement (FIGS. 14 and 15), or a knurled configuration (FIGS. 16 and 17) so as to enhance the thermal energy transfer between display gudgeon 43 and base gudgeon 49.

Referring to FIGS. 3–5 and 18–21, first passive heat transfer device 46 comprises a heat pipe formed as a vacuum tight tube 82, a wick 85, and a working fluid 87. Tube 82 is formed so as to comprise a straight, partially flattened evaporation end 89 and a condensation end 91 that is arranged at a substantially 90° angular relationship to evaporation end 89. Tube 82 is often a relatively long, somewhat flattened cylinder formed from a highly thermally conductive material, e.g., copper, aluminum, or their alloys, monel, or the like. A vapor space 93 is defined by a central passageway extending along the longitudinal axis of vacuum tight tube 82. Wick 85 may comprise adjacent layers of screening or a sintered powder structure with interstices between the particles of powder. In one embodiment, wick 85 may comprise aluminum-silicon-carbide (AlSiC) or copper-silicon-carbide (CuSiC) having an average thickness of about 0.1 mm to 1.0 mm. Working fluid 87 may comprise any of the well known two-phase vaporizable liquids, e.g., water alcohol, freon, etc. Heat pipe 46 is formed according to the invention by drawing a partial vacuum within tube 82, and then back-filling with a small quantity of working fluid 87, e.g., just enough to saturate wick 85 just prior to final sealing of tube 82 by pinching and welding or otherwise hermetically sealing off both ends 89 and 91. The atmosphere inside heat pipe 46 is set by an equilibrium of liquid and vapor 92.

Figure 30:
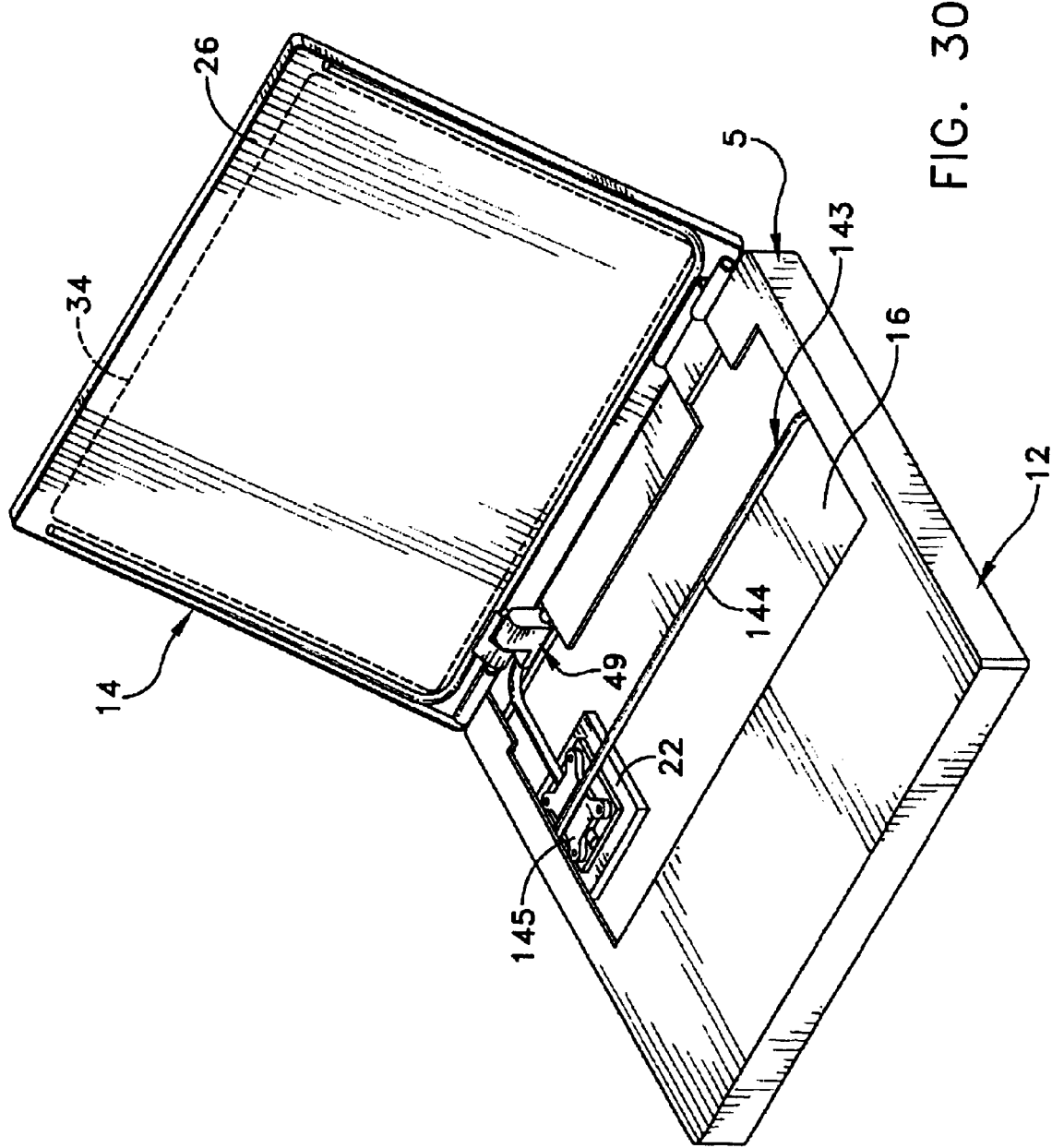
FIG. 30 is a perspective view of the portable computing device shown in FIG. 1, with the keypad and liquid crystal display removed for clarity of illustration, and including a further alternative embodiment of a cooling system formed in accordance with the present invention.
Figure 31:
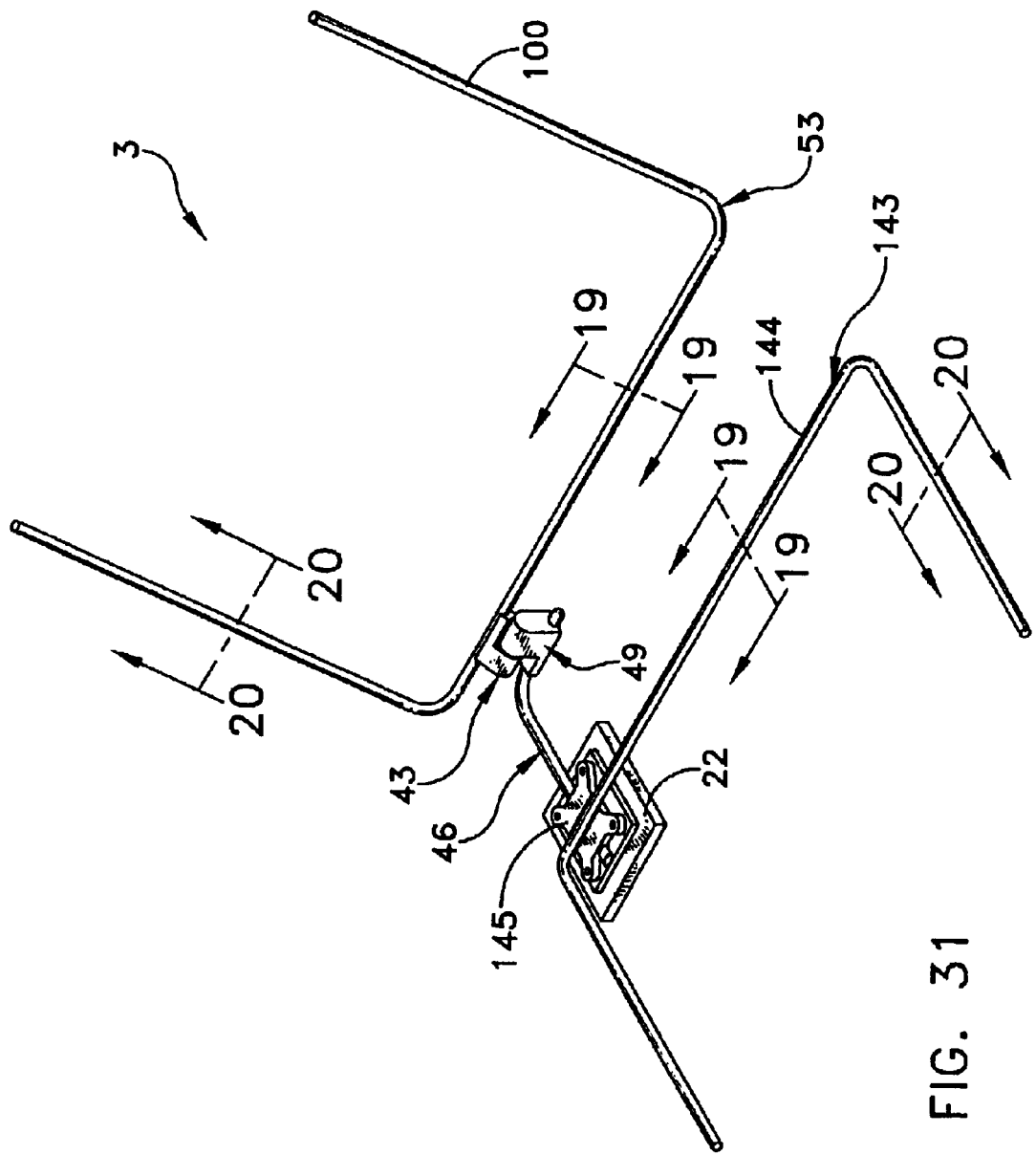
FIG. 31 is a perspective view of the cooling system shown in FIG. 30.
Figure 32:
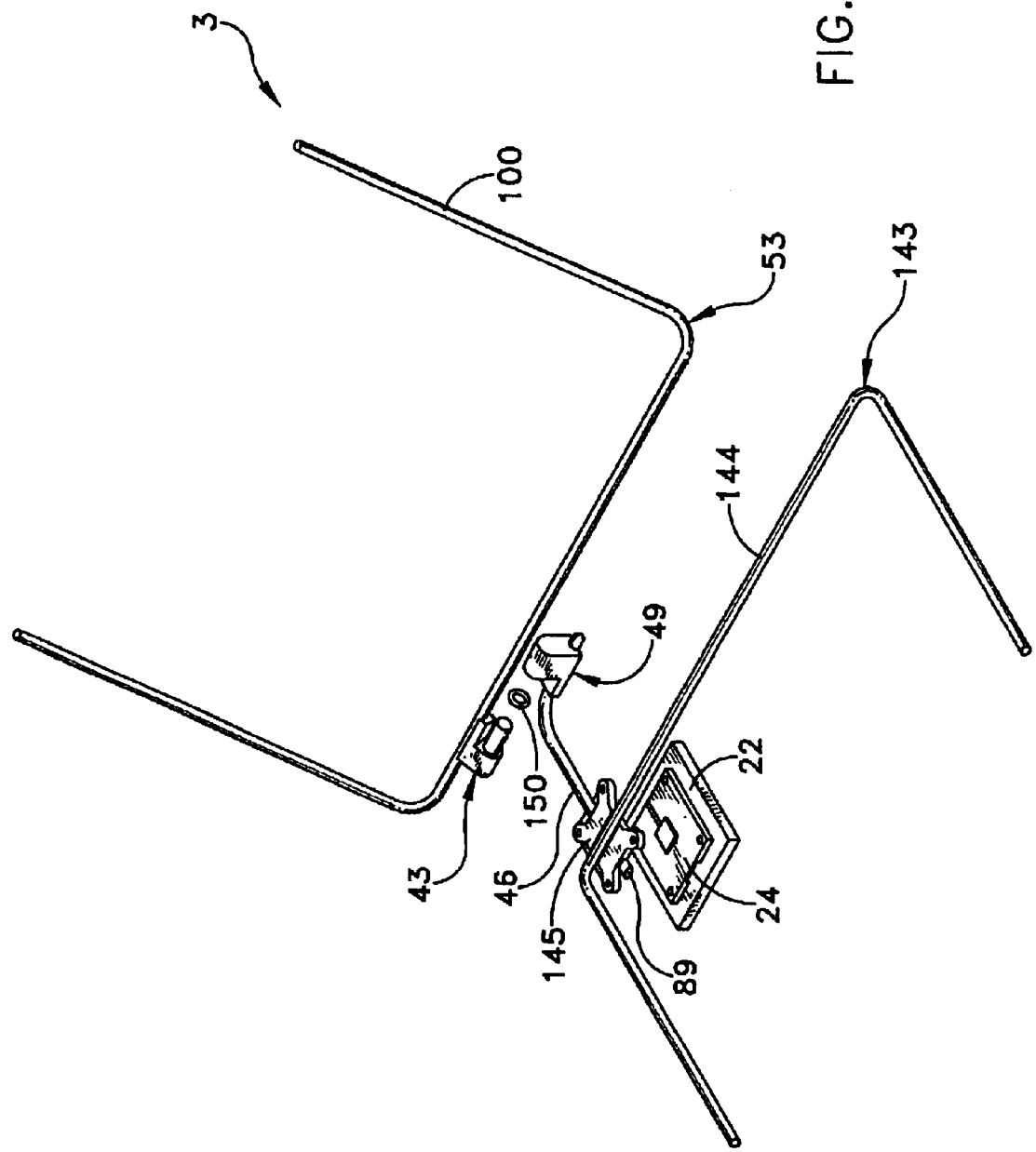
FIG. 32 is an exploded perspective view, of the cooling system shown in FIG. 31.

Referring to FIGS. 18–21, second passive heat transfer device 53 is sized and shaped so as to be positioned within a portion of display housing 14, in surrounding or substantially surrounding relation to planar plate 34, so as to maximize heat transfer. In a preferred embodiment, second passive heat transfer device 53 may comprise a heat pipe 100, a thermosiphon 106, or a loop thermosiphon 108. More particularly, heat pipe 100 (FIGS. 18 and 21–23) is formed in accordance with the formation of heat pipe 46, i.e., having vacuum tight tube 112, a wick 115, and a working fluid 117. Heat pipe 100 is often longer than heat pipe 46, and may comprise a substantially rectilinear profile so as to match the shape of display housing 14. In one embodiment, heat pipe 100 comprises a four mm tube that is flattened to three mm to increase surface overlap with planar plate 34. Planar plate 34 is often set within display housing 14, along top wall 26, and behind liquid crystal display screen 30, and is connected in thermal transfer communication with condenser portions of heat pipe 100, via conventional thermo-mechanical fasteners 107 (FIG. 2) or by soldering or brazing the edge portions of planar plate 34 to heat pipe 100 (shown in phantom in FIGS. 1 and 30).

Referring to FIGS. 24–26, thermosiphon 106 comprises a highly thermally conductive, closed tube 122 having an evaporator section 124 and a condenser section 126. More particularly, evaporator section 124 of thermosiphon 106 is disposed along a bottom course of tube 122, where the interior of tube 122 may be lined with a wick structure 127 to facilitate pooling of working fluid 117 in evaporator region 124. Wick structure 127 may comprise adjacent layers of screening or a sintered powder structure with interstices between the particles of powder, e.g., sintered powders of (AlSiC) or (CuSiC) having an average thickness of about 0.1 mm to 1.0 mm. Working fluid 117 is disposed within tube 122, and may comprise any of the well known two-phase vaporizable liquids, e.g., water alcohol, freon, etc. Condenser section 126 normally does not contain a wick structure, and is connected in flow communication with evaporator section 124, via the interior of tube 122. Sealed ends 130 of condenser section 126 are often angled upwardly relative to evaporator section 124 so as to facilitate the return of working fluid 117 under the influence of gravity.

As liquid is heated within evaporator section 124, the pressure increases forcing a mixture of vapor and liquid to flow through tube 122, toward condenser section 126. The amount of liquid contained in this mixture may vary from heavily saturated with liquid to pure vapor (no liquid); dependent upon the amount of heat that is absorbed by the liquid during the time it is resident within evaporator section 124. The vapor condenses on the walls of tube 122 in and around condenser section 126 thereby giving up a significant portion of its thermal energy. As liquid condenses on the walls of tube 122 within condenser section 126, it flows under the influence of gravity from condenser section 126 back through tube 122, and into evaporator section 124 for reheating.

Figure 28:
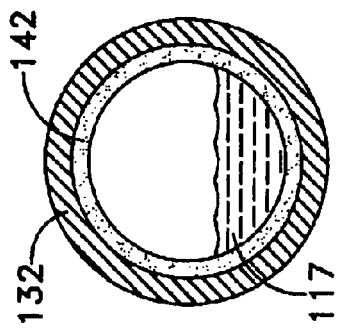
FIG. 28 is a cross-sectional view of the loop thermosiphon shown in FIG. 27, as taken along line 28—28 in FIG. 27.
Figure 29:
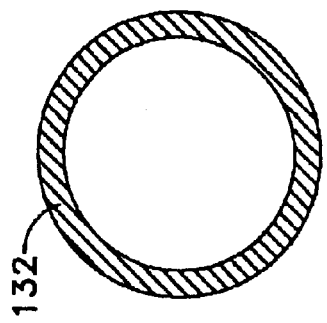
FIG. 29 is a cross-sectional view of the loop thermosiphon shown in FIG. 27, as taken along line 29—29 in FIG. 27.
Figure 27:
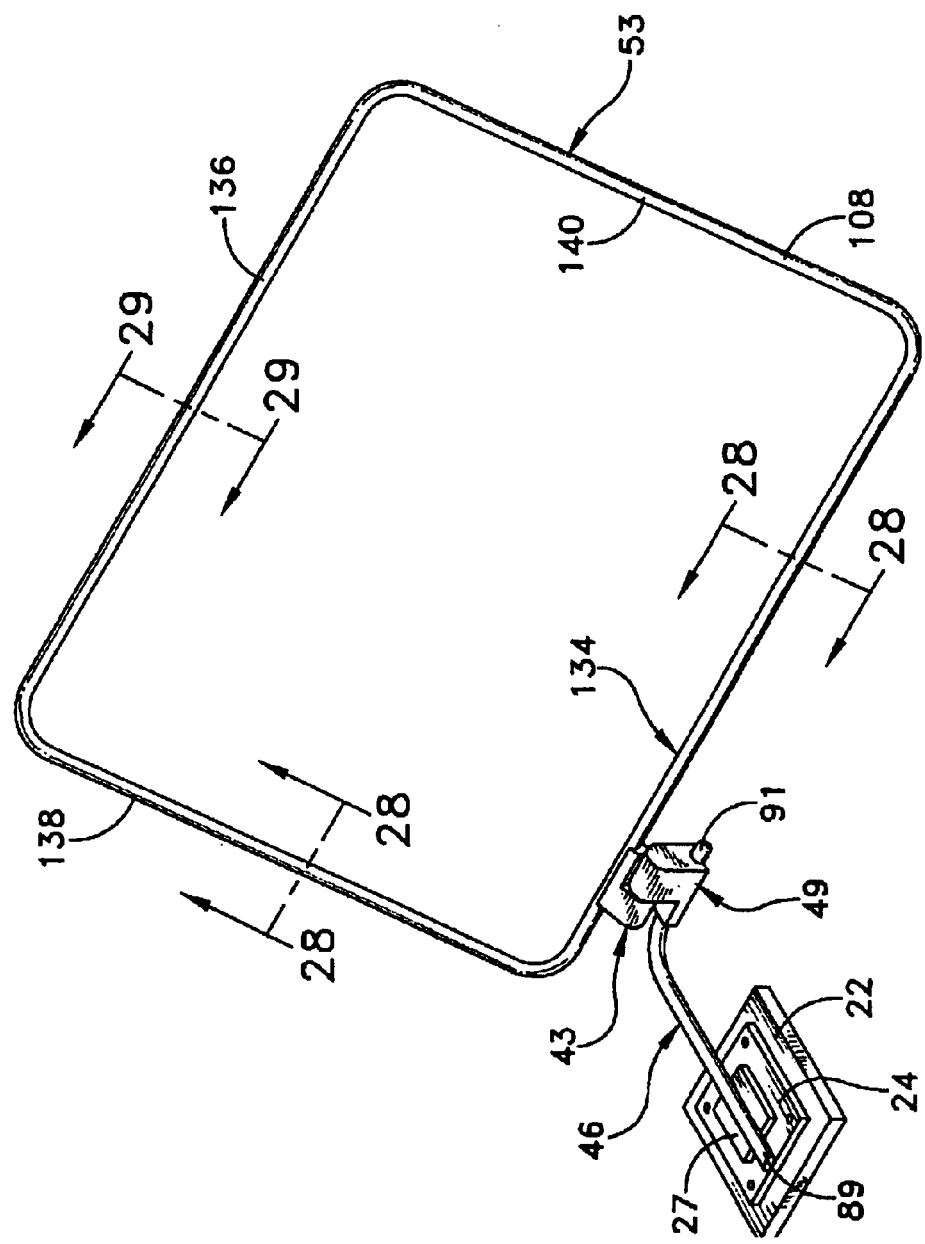
FIG. 27 is yet a further alternative embodiment of a cooling system for a portable computing device formed in accordance with the present invention and comprising a loop thermosiphon.

Referring to FIGS. 27–29, loop thermosiphon 108 comprises a highly thermally conductive, closed tube 132 having an evaporator section 134, a condenser section 136, a vapor conduit 138, a condensate conduit 140, and a wick structure 142. More particularly, evaporator section 134 of loop thermosiphon 108 is disposed along a bottom course of tube 132, where the interior of tube 132 is lined with wick structure 142. Wick structure 142 may comprise adjacent layers of screening or a sintered powder structure with interstices between the particles of powder, e.g., sintered powders of (AlSiC) or (CuSiC) having an average thickness of about 0.1 mm to 1.0 mm. Working fluid 117 is disposed within tube 132, and may comprise any of the well known two-phase vaporizable liquids, e.g., water alcohol, freon, etc. Condenser section 136 is connected in flow communication with evaporator section 134, via vapor conduit 138 and condensate conduit 140, so as to form a closed loop.

As liquid flows from condenser section 136 through condensate conduit 140, and into evaporator section 134, a mixture of liquid and vapor flows out of evaporator section 134 into vapor conduit 138. The amount of liquid contained in this mixture may vary from heavily saturated with liquid to pure vapor (no liquid); dependent upon the amount of heat that is absorbed by the liquid during the time it is resident within evaporator section 134. As the liquid is heated in evaporator section 134, the pressure increases forcing the mixture of vapor and liquid to flow through vapor conduit 138, toward condenser section 136. As liquid condenser on the walls of tube 132 in and around condenser section 136, the condensed working fluid flows back to evaporator section 134 through condensate conduit 140.

Figure 19:
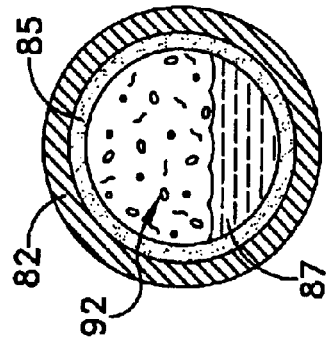
FIG. 19 is a cross-sectional view of the heat pipe shown in FIGS. 18 and 31, as taken along line 19—19 in FIGS. 18 and 31.
Figure 20:
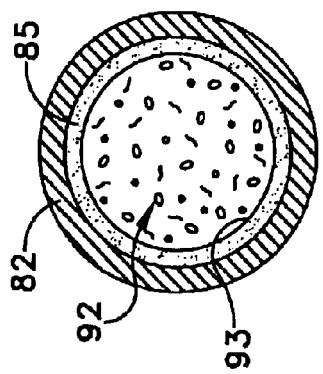
FIG. 20 is a cross-sectional view of the heat pipe shown in FIGS. 18 and 31, as taken along line 20—20 in FIGS. 18 and 31.
Figure 18:
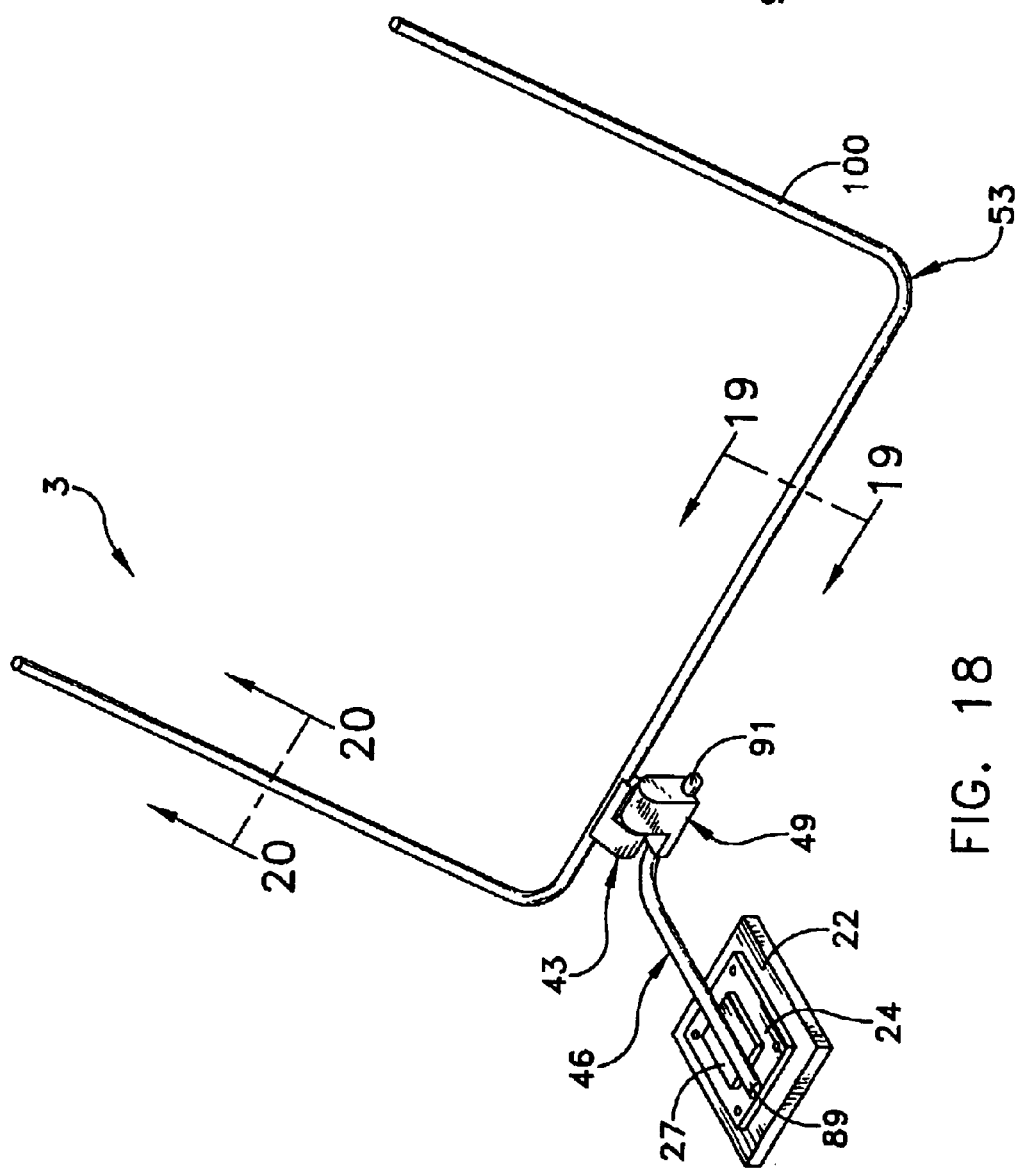
FIG. 18 is a perspective view of a cooling system formed in accordance with the present invention comprising a heat pipe.

Referring to FIGS. 18–20 and 30–32, in an alternative embodiment of the present invention, cooling system 3 may comprise a third passive heat transfer device 143 that is sized and shaped so as to be positioned within a portion of base 12, in surrounding or partially surrounding relation to the central processing unit, memory, hard drive, disk drives, and keyboard circuitry so as to further maximize heat transfer. Third passive heat transfer device 143 may comprise a heat pipe 144 that is formed in accordance with the formation of heat pipes 46 and 100, e.g., having vacuum tight tube 82, a wick 85, and a working fluid 87 (FIGS. 19 and 20). Heat pipe 144 may have a similar contour to heat pipe 100, and is often longer than heat pipe 46. In a preferred embodiment, heat pipe 144 comprises a substantially rectilinear profile so as to match the shape of base 12. A thermal interface plate 145 is positioned within base 12 in intimate thermal communication with evaporator end 89 of heat pipe 46. A portion of heat pipe 144 is mounted within a slot in thermal interface plate 145 and fastened in place by soldering or brazing.

One preferred embodiment of cooling system 3 is assembled to PDA or laptop computer 5 in the following manner. Thermal block 27 is assembled to processor 24 and arranged in intimate thermal communication by the use of thermal epoxy, thermal grease, or the like. In this arrangement, slot 28 is exposed on the top of thermal block 27. Once in this position, evaporator end 89 of first passive heat transfer device 46 is positioned within slot 28 so as to create a thermal communication link between thermal block 27 and evaporator end 89.

Base gudgeon 49 is assembled to condenser end 91 of first passive heat transfer device 46 by arranging recess groove 76 in confronting parallel relation to condenser end 91. Once in this position, base gudgeon 49 is moved toward first passive heat transfer device 46 such that condenser end 91 is received within recessed groove 76. Condenser end 91 is arranged so as to be thermally engaged with base gudgeon 49 by the use of thermal epoxy, thermal grease, or a braze, solder or weld between that portion of tube 82 that defines condensation end 91 and the surface of base gudgeon 49 that the defines recess groove 76.

Display gudgeon 43 is assembled to second passive heat transfer device 53 by arranging recess groove 66 in confronting parallel relation with the evaporator section of second passive heat transfer device 53. Once in this position, display gudgeon 43 is moved toward second passive heat transfer device 53 such that a portion of the evaporator section is received within recessed groove 66. A thermal communication bond is formed between display gudgeon 43 and second passive heat transfer device 53 by the use of thermal epoxy, thermal grease, soldering, brazing, or welding.

In order to complete assembly of cooling system 3, display gudgeon 43 must be assembled to base gudgeon 49. More particularly, journal 73 is first filled with an appropriate thermal grease to facilitate a low thermal resistance at the interface between display gudgeon 43 and base gudgeon 49. Pintle 63 is then moved into coaxially aligned confronting relation with journal 73. It should be noted that a sealing grommet 150 may be positioned in counter-sink 74 of base gudgeon 49 prior to assembly so as to prevent the thermal grease from being displaced from journal 73 during insertion and operation of pintle 63. Sealing grommet 150 also acts to prevent the thermal grease disposed between pintle 63 and the surface of journal 73 from drying up during the operating life of portable computing device 5. Display gudgeon 43 is then moved toward base gudgeon 49 so that pintle 63 enters journal 73. As a result of this arrangement a hinged thermal interconnection is formed between first passive heat transfer device 46 and second passive heat transfer device 53.

During operation of portable computer 5, operating heat from processor 24 is conducted to evaporation end 89 of heat pipe 46 through thermal block 27. Operating heat received by evaporation end 89 is transferred along the length of heat pipe 46 to its condensing/hinge member end 91 where the thermal energy is conductively transferred through thermal block 57 of base gudgeon 49 to pintle 63. The thermal energy is then conductively transferred across the thermal boundary between journal 73 and pintle 63 by means of a high performance thermal grease, e.g., a thermal grease, such as a silver filled grease or the like. The thickness of the thermal grease will vary depending upon the performance requirements of portable computer 5. As thermal energy is transferred to display gudgeon 43, it is conducted through support arm 70 and thermal block 67 to second passive heat transfer device 53 and dissipated to the ambient environment, via plate 34 in top wall 26 of display housing 14. It will be understood that in the embodiment shown in FIGS. 30–32, operating heat is also transferred to the portion of heat pipe 144 positioned within thermal interface 145 so that it can be distributed within base 12 to further enhance heat transfer away from processor 24.

It is to be understood that the present invention is by no means limited only to the particular constructions herein disclosed and shown in the drawings, but also comprises any modifications or equivalents within the scope of the claims.

What is claimed is:

1. An electronic apparatus comprising:
   a housing having first end second portions;
   a heat generating component carried in said first housing portion;
   a first passive heat transfer device carried within said first housing portion and having a first end thermally coupled to said heat generating component, and a second end;
   a second passive heat transfer device carried within said second housing portion and having a first end thermally coupled to said second housing portion, and a second end; and
   a hinge structure interconnecting said first and second housing portions for pivotal movement relative to one another, said hinge structure including:
      a heat conductive first gudgeon having a pintle and a thermal interface block having a recess defined in an outer surface wherein said thermal interface block is anchored to said second housing portion and connected in thermal communication with a portion of said second passive heat transfer device, and further including a support arm that projects outwardly from an end of said thermal block and wherein said pintle projects outwardly from a top end of said support arm so as to be positioned in substantially parallel relation to said thermal block; and
      a heat conductive second gudgeon having a journal and a thermal interface block wherein said thermal interface block is connected in thermal communication with said first passive heat transfer device and said pintle is rotatably received within said journal so as to be in heat exchange relationship with said second gudgeon, and thereby forming an integral portion of said hinge structure.

2. An electronic apparatus according to claim 1 wherein said pintle is arranged in parallel relation to said recess.

3. An electronic apparatus according to claim 1 wherein said pintle comprises a solid cylindrical pin having a textured outer surfaces so as to enhance the thermal energy transfer between said first gudgeon and said second gudgeon.

4. An electronic apparatus according to claim 1 wherein said pintle comprises a plurality of grooves defined in an outer surface so as to enhance the thermal energy transfer between said first gudgeon and said second gudgeon.

5. An electronic apparatus according to claim 4 wherein said grooves are arranged in parallel relation to one another so as to enhance the thermal energy transfer between said first gudgeon and said second gudgeon.

6. An electronic apparatus according to claim 4 wherein said grooves are arranged in helical relation to one another so as to enhance the thermal energy transfer between said first gudgeon and said second gudgeon.

7. An electronic apparatus according to claim 4 wherein said grooves are arranged in helical relation to one another.

8. An electronic apparatus according to claim 4 wherein said grooves comprise a knurled pattern so as to enhance the thermal energy transfer between said first gudgeon and said second gudgeon.

9. An electronic apparatus according to claim 1 wherein said second gudgeon includes a thermal block formed from a highly thermally conductive material and having a recess defined in an outer surface.

10. An electronic apparatus according to claim 9 wherein said second gudgeon includes a support arm that projects outwardly from one end of said thermal block and has a journal that comprises a cylindrical hole, that extends inwardly from a top end of said support arm so as to be arranged in substantially parallel relation to said thermal block.

11. An electronic apparatus according to claim 10 wherein said journal is arranged in parallel relation to said second gudgeon recess.

12. An electronic apparatus according to claim 10 wherein said support arm further includes a counter-sink that is annularly defined around an entrance to said journal.

13. An electronic apparatus according to claim 10 wherein said journal includes texturing defined in an inner surface of said support arm so as to enhance the thermal energy transfer between said first gudgeon and said second gudgeon.

14. An electronic apparatus according to claim 13 wherein said textured surface comprises a plurality of grooves so as to enhance the thermal energy transfer between said first gudgeon and said second gudgeon.

15. An electronic apparatus according to claim 13 wherein said grooves are arranged in parallel relation to one another.

16. An electronic apparatus according to claim 13 wherein said grooves comprise a knurled pattern.

17. An electronic apparatus according to claim 1 wherein said second passive heat transfer device comprises a thermosiphon.

18. An electronic apparatus according to claim 17 wherein said thermosiphon comprises a working fluid, an evaporator section and a condenser section, said condenser section having sealed end portions that are angled upwardly relative to said evaporator section so as to facilitate the return of said working fluid under the influence of gravity.

19. An electronic apparatus according to claim 1 wherein said second passive heat transfer device comprises a loop thermosiphon.

20. An electronic apparatus according to claim 1 wherein said second passive heat transfer device comprises a loop heat pipe.

21. An electronic apparatus comprising:
   a housing having first and second portions;
   a heat generating component carried in said first housing portion;
   a first passive heat transfer device carried within said first housing portion and having a first end thermally coupled to said heat generating component, and a second end wherein said first passive heat transfer device comprises a heat pipe having a partially flattened evaporation end and a condensation end that are arranged at a substantially 90° angular relationship to one another;

a second passive heat transfer device carried within said second housing portion and having a first end thermally coupled to said second housing portion, and a second end; and a hinge structure interconnecting said first and second housing portions for pivotal movement relative to one another, said hinge structure including:

a heat conductive first gudgeon having a pintle and a thermal interface block wherein said thermal interface block is anchored to said second housing portion and connected in thermal communication with a portion of said second passive heat transfer device; and a heat conductive second gudgeon having a journal and a thermal interlace block wherein said thermal interface block is connected in thermal communication with said first passive heat transfer device and said pintle is rotatably received within said journal so as to be in heat exchange relationship with said second gudgeon, and thereby forming an integral portion of said hinge structure.

* * * * *